UNITED STATES PATENT OFFICE.

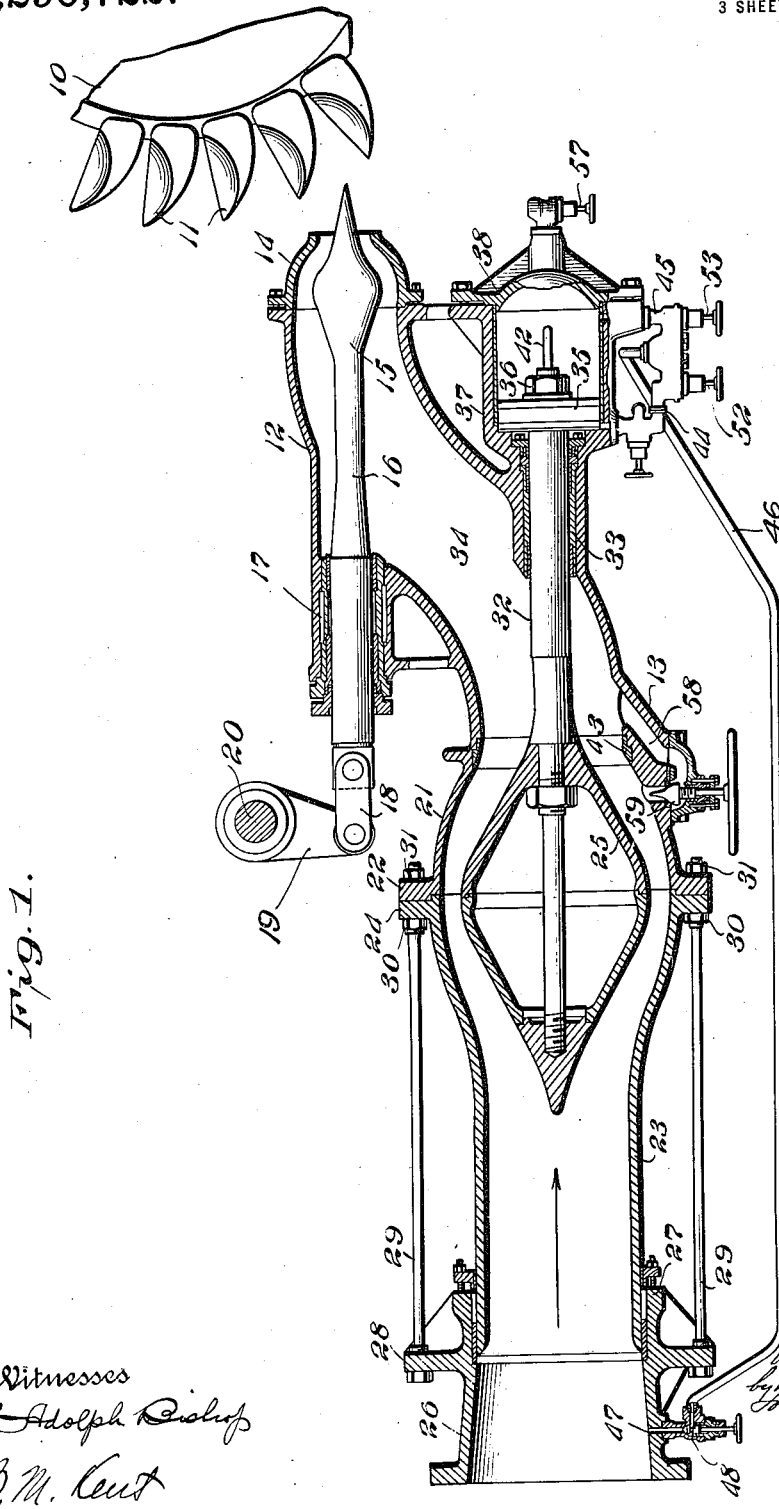

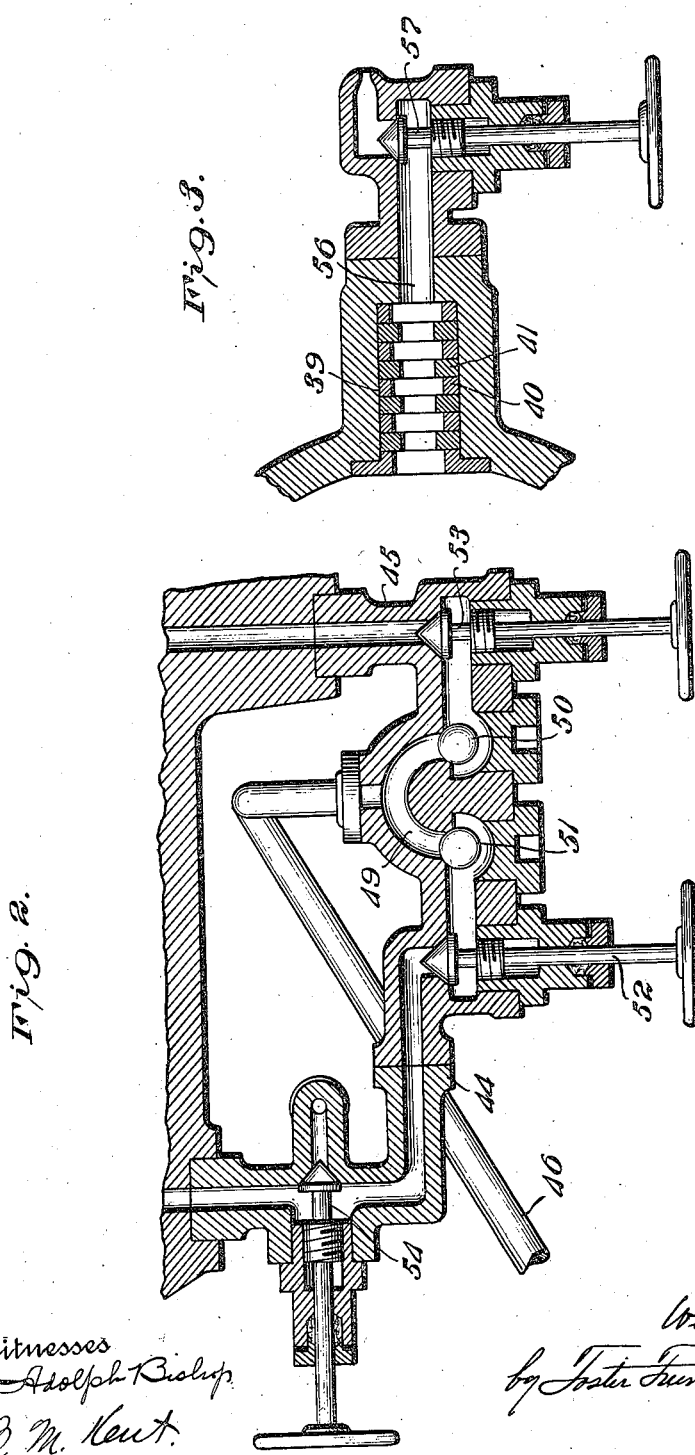

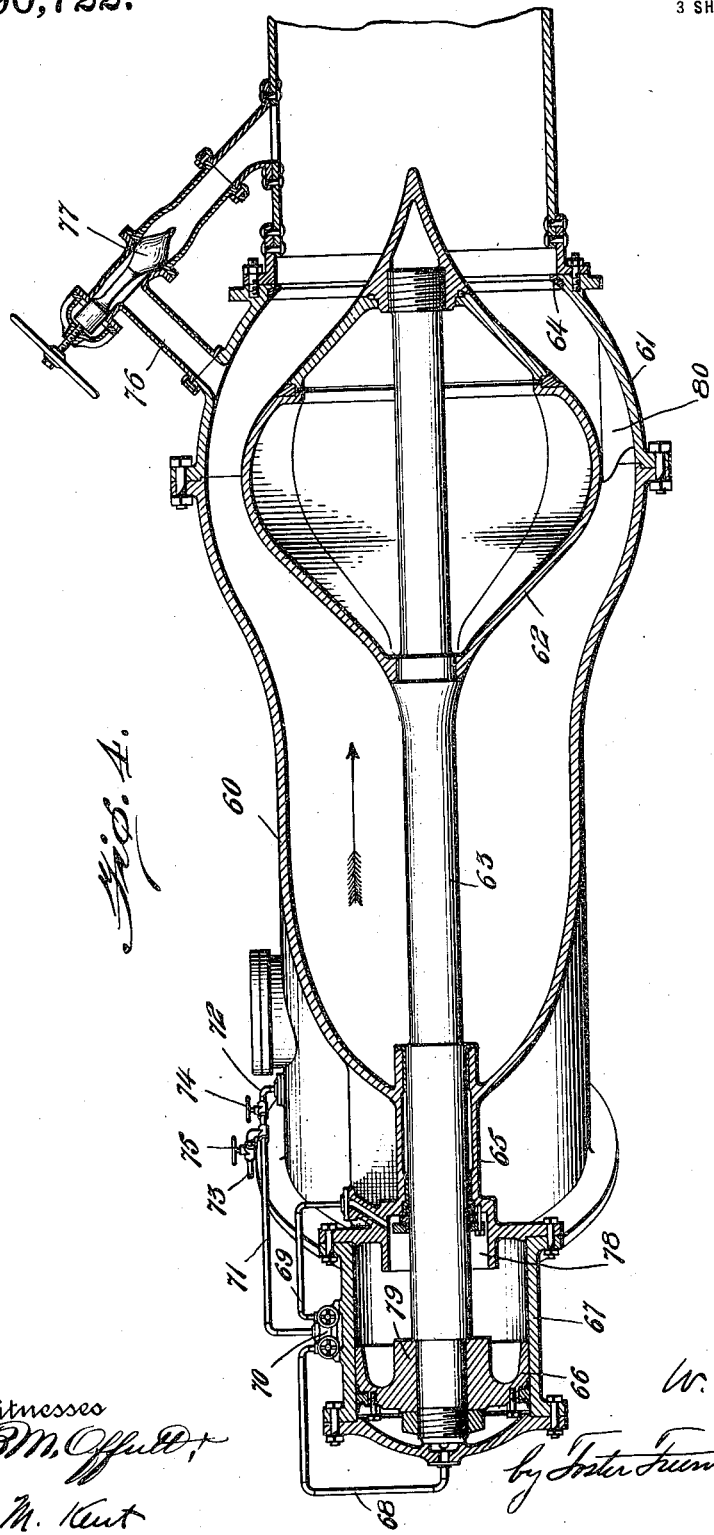

WILLIAM A. DOBLE, OF SAN FRANCISCO, CALIFORNIA, ASSIGNOR TO PELTON WATER WHEEL COMPANY, OF SAN FRANCISCO, CALIFORNIA, A CORPORATION OF CALIFORNIA.

WATER-CONDUIT AND VALVE THEREFOR.

1,290,722.  Specification of Letters Patent.  Patented Jan. 7, 1919.

Application filed December 27, 1913. Serial No. 809,080.

*To all whom it may concern:*

Be it known that I, WILLIAM A. DOBLE, a citizen of the United States, and resident of San Francisco, county of San Francisco, State of California, have invented certain new and useful Improvements in Water-Conduits and Valves Therefor, of which the following is a specification.

This invention relates to water valves generally and to nozzle constructions especially adapted for use in connection with hydraulic impact turbines. The invention also relates to means for operating valves whereby their closing is effected gradually and without shock.

One of the objects of the invention is to provide a needle valve in a hydraulic pipe line, the valve to act as a stop valve for the purpose of shutting off or regulating the flow of water. Valves which have been heretofore used in hydraulic pipe lines, for this purpose, have been subject to numerous disadvantages, among which are the formation of eddies and the accumulation of sand, pebbles, etc., carried by the water and which interfere with the operation of the valve.

Another object of the invention is to provide a control valve and nozzle for a hydraulic turbine, having integrally formed body members. A further object is to provide improved operating means for hydraulic valves whereby the final closing movement is effected very gradually and without detrimental effects on the pipe line.

A further object is to provide a valve body with improved means for rendering the valve accessible from the exterior.

Other objects and the features of novelty will be apparent from the following description taken in connection with the accompanying drawings in which, Figure 1 is a longitudinal section of a valve and nozzle embodying my invention;

Fig. 2 is an enlarged section through the valve mechanism for controlling the operating cylinder;

Fig. 3 is an enlarged detail of the retarding device for the valve;

Fig. 4 is a longitudinal section of another valve and its operating mechanism embodying my invention.

Referring to Figs. 1 to 3 of the drawings, 10 indicates an impact wheel provided with buckets 11. A nozzle or valve body 12 has integrally formed therewith the valve body 13 and, as clearly shown, the center line of the two bodies and the connecting conduit form a conduit section of reverse curvature. On the outer end of the nozzle body is a nozzle 14 and arranged therein is a needle valve 15 having a rearwardly projecting stem 16 extending through a stuffing box 17 in the casing of the nozzle body. The stem 16 has pivotally connected therewith at its outer end a link 18 which is also pivotally connected with arm 19 on rocker shaft 20. The rocker shaft 20 is connected with a governor or manually operable means (not shown) for regulating the position of the needle valve. The valve body 13 has an enlarged portion 21 forming a chamber for the valve 25 and is provided with an outwardly projecting flange 22. Secured to the flange 22 is a conduit section 23 having a flange 24 which abuts the flange 22. The conduit section 23 is suitably enlarged to form with the valve body 13 the chamber for the valve 25. The opposite end of the conduit section 23 is cylindrical in form and projects into the section 26 of the supply conduit for the nozzle. The section 26 is provided with a stuffing box through which the cylindrical portion of the conduit section 23 passes and which is adapted to prevent leakage between the sections. The conduit section 26 has formed thereon an outwardly projecting flange 28 having openings in which are secured one end of the bolts 29, the opposite ends of these bolts passing through the flanges 22 and 24, and being adapted to secure said flanges together by means of nuts 30 and 31. The rods 29 thus serve to hold the conduit section 26 and the valve body 13 in fixed relation. When it is desired to have access to the valve 25, the nuts 30 are loosened and the conduit section 23 moved backward into the conduit section 26.

The valve 25 has secured thereto a stem 32 which passes through a stuffing box 33 formed in the wall of the passage 34 connecting the valve body with the nozzle body. It will be noted that this passage is of easy curvature so that there will be little resistance to the flow therethrough and eddy currents will be avoided.

The outer end of the valve stem 32 has mounted thereon a piston 35 which is secured by a nut 36. The piston 35 is mounted for movement in a cylinder 37 which is secured to the casting forming the valve body and nozzle body. The outer end of the cylinder 37 is provided with a head 38 which has an axial recess 39 in which are arranged a plurality of rings 40 and 41, the rings 41 having a smaller internal diameter than the rings 40. The end of the piston rod 32 is reduced in size to form the projection 42 which is adapted to pass through the openings in the rings 40 and 41 as the piston moves toward the right. The valve body 13 is provided with a seat 43 against which the valve is adapted to close. The flow through the conduit to the nozzle is indicated by the arrow and it will be noted that the valve moves in the direction of flow when closing and in order to avoid too rapid closing, which might cause disastrous results to the conduit, the extension 42 co-acting with the passage through the rings 40 and 41 forms a retarding device for the movement of the valve and thus insures a slow movement thereof as the valve comes to its seat.

For the purpose of controlling the movement of the valve, conduits 44 and 45 are provided and these conduits communicate respectively with the opposite ends of the cylinder 37 and with a common supply conduit 46 which leads from the main supply conduit and is shown as connected to the same at a point 47 in the conduit section 26. A valve 48 is arranged to control the flow of water into conduit 46. The conduit 46 is branched at 49 to communicate with the conduits 44 and 45 and there branches are provided with check valves 50 and 51. Arranged in the conduits 44 and 45 are valves 52 and 53, which respectively control the passage of water from the conduit 46 to the cylinder 37. The conduit 44 is also provided with an exhaust valve 54 which is adapted to exhaust the water from the left hand end of the cylinder 37.

Communicating with the outer end of the recess 39 is a passage 56 leading to an exhaust valve 57 which is adapted to control the exhaust of water from the right hand end of cylinder 37. The check valves 50 and 51 are adapted to open to permit water to flow into the cylinder 37 but will close whenever the water tends to flow in the opposite direction. This arrangement of the check valves prevents water from flowing from one side of the piston to the other whenever the valves 52 and 53 are left open and would also prevent the closing of the valve 25 in case the pipe 46 were broken as it would prevent water from flowing out of cylinder 37 through the opening which would be thus provided in conduit 46. The passage 58 which is controlled by a by-pass valve 59 is arranged to communicate with the interior of the valve body on opposite sides of the seat 43 for the purpose of balancing the pressure on opposite sides of the valve when it is desired to open the same.

The operation of the valve 25 is as follows: Assuming the valve to be in the closed position, the valves 48, 53 and 54 are opened and water will pass through the conduit 46, past the check valve 50 and through the valve 53 into the right hand end of cylinder 37 and open the valve 25, any water which may be in the left hand end of the cylinder passing out through the valve 54. To close the valve 25 the valves 48, 52 and 57 are opened, whereby water will flow through the conduit 46 past the check valve 51, through the valve 52 into the left hand end of cylinder 37. As the piston 35 moves toward the right the extension 42 on the end of the valve stem 32 will enter the rings 40 and 41. The extension 42 is of somewhat smaller diameter than the interior of the rings 41 and as this extension enters these rings the exhaust passage for the water from the cylinder will be greatly reduced in area; and as the extension 42 moves farther into these rings the exhaust will be more and more restricted due to the frictional losses in passing between the rings and the extension 42 and also due to eddy currents formed in the spaces within the rings 40 which are of larger internal diameter than the rings 41. This means for progressively restricting the exhaust from the cylinder 37 serves to allow the valve to come to its seat gradually, thereby eliminating all danger which might result from a sudden closure of the valve.

It will be noted that the valve 25 moves longitudinally of the supply conduit and is arranged parallel with the valve 15 and that both valves have a closing movement in the direction of flow. It will also be noted that the stem of the valve 25 extends forwardly in the direction of flow, whereby the stem is in compression when the valve is open and also would prevent the valve from suddenly closing in case the valve stem broke.

In the form of the invention shown in Fig. 4, a conduit 60 provided with a bend therein has an enlargement 61 for a needle valve 62 which is carried by a stem 63. The axis of the stem 63 coincides with the axis of one of the straight portions of the conduit and the conduit is provided with a seat 64 which is engaged by the valve 62 when the latter is in closed position. The stem 63 projects through a suitable stuffing box 65 in the conduit wall and carries a piston 66 which is arranged in a cylinder 67 supported on the conduit. The pipes 68 and 69 lead to the opposite ends of the cylinder 67 from a valve mechanism 70, preferably of the type shown in Fig. 2. Water is supplied to the valve mechanism 70 by means of a pipe 71 having two branches 72 and 73. The branch 72 communicates with the interior of the conduit 60 and is controlled by a valve 74. The branch 73 may be connected with a pump or any other convenient source of fluid pressure and is controlled by a valve 75.

A by-pass 76 controlled by a valve 77 is adapted to convey water around the seat 64 and thereby balance the pressures on the valve 62.

The inner end wall of the cylinder 67 has formed therein a cylindrical chamber 78 which receives the hub 79 of the piston 66, there being a slight clearance between the hub and the wall of the chamber 78. It will be observed that the pipe 69 communicates with the chamber 78 and therefore the water which passes to and from the cylinder 67 through the pipe 69 passes through this chamber. At a certain point in the closing movement of the valve 62 the hub 79 enters the chamber 78 and thus greatly restricts the flow of water from the cylinder 67 to the pipe 69 so that the movement of the valve 62 will be retarded. As the valve 62 approaches its seat the retarding effect is increased and the valve will finally engage the seat when moving so slowly that there will be no detrimental effect on the pipe line.

The water flows through the conduit 60, preferably in the direction of the arrow and, as will be seen from the drawing, the passage around the valve is of such a character that there will be little or no disturbance of the water and there will be no accumulation of sand, pebbles, etc. The flow of the water through the valve maintains the seat 64 in a perfectly clean condition so that when the valve is closed the flow of water will be entirely cut off and the amount of leakage will be a minimum.

The structure shown in Fig. 4 is especially adapted for very large conduits and in order to support the valve 62 I arrange in the enlarged portion 61 of the conduit suitable guides or vanes 80.

I have illustrated and described what I consider to be the preferred forms of my invention but it is understood that various changes may be made in the details of construction without departing from the spirit of my invention as set forth in the claims, and therefore I do not wish to be limited to the exact constructions shown and described.

Having described my invention what I claim and desire to secure by Letters Patent is, 1. The combination of a conduit section of reverse curvature so as to provide inlet and discharge ends with parallel axes but relatively offset, of needle valves in said ends, both of said valves having a closing movement in the direction of flow, stems secured to said valves and projecting through the walls of said conduit section, and means for actuating said valves.

2. The combination of a conduit having an enlarged portion to form a valve chamber, a needle valve in said chamber, the point of which is directed against the flow through the conduit, said valve having a closing movement in the direction of flow, and a stem for said valve projecting forwardly therefrom through the wall of the conduit.

3. The combination of a conduit having a bend therein and an enlarged portion at the bend, a needle valve arranged in said enlarged portion and having a closing movement in the direction of flow through the conduit, and a by-pass adapted to convey water around said valve when the latter is in closed position.

4. The combination of a conduit having a bend therein and an enlarged portion at the bend, of a needle valve arranged in said enlarged portion and having a stem extending through the wall of the conduit, a fluid pressure means connected with said stem and adapted to move the valve to and from closed position, and a by-pass adapted to convey water around the valve when the latter is closed.

5. In an apparatus of the class described, the combination of a conduit, a needle valve longitudinally arranged in said conduit and adapted to close in the direction of flow in said conduit, fluid pressure means for moving said valve, and means for controlling the flow of fluid from said fluid pressure means, said controlling means being automatically rendered operative during the closing movement of said valve.

6. In an apparatus of the class described, the combination of a conduit, a needle valve longitudinally arranged in said conduit and adapted to close in the direction of flow in said conduit, fluid pressure means for moving said valve, and means for controlling the flow of fluid from said fluid pressure means, said controlling means being automatically rendered operative during the closing movement of said valve and adapted to progressively retard said closing movement.

7. In an apparatus of the class described, the combination of a conduit, a valve in said conduit, a stem on said valve and having a piston thereon, a cylinder in which said piston moves, means for admitting a pressure fluid to said cylinder, means for exhausting fluid from the same, said exhaust means for one end of said cylinder comprising a passage of alternately increasing and decreasing cross sectional area, and means moving with said piston and adapted to enter said passage and retard the exhaust therethrough.

8. In an apparatus of the class described, the combination of a conduit, a needle valve in said conduit arranged to close in the direction of flow in said conduit, a stem on said valve extending through the wall of said conduit, a piston on said stem exterior of said conduit, a cylinder in which said piston moves, means for admitting a pressure fluid to said cylinder, means for exhausting fluid from the same, said exhaust means for one end of said cylinder comprising a passage of alternately increasing and decreasing cross-sectional area, and a plunger connected with said piston and adapted to enter said passage and progressively retard the closing movement of said valve.

9. In an apparatus of the class described, the combination of a conduit, and a valve longitudinally arranged in said conduit, said conduit comprising telescopic sections adapted to permit access to said valve.

10. In an apparatus of the class described, the combination of a conduit, and a valve longitudinally arranged in said conduit, said conduit comprising fixed sections and an intermediate section having a telescopic connection with one of said fixed sections.

11. In an apparatus of the class described, the combination of a conduit, and a valve longitudinally arranged in said conduit, said conduit comprising fixed sections and an intermediate section having a rigid connection with one of said fixed sections adjacent said valve and a telescopic connection with the other of said fixed sections at a point remote from said valve whereby access may be had to said valve by sliding said intermediate section into one of said fixed sections.

12. In an apparatus of the class described, the combination of a conduit, a valve in said conduit, fluid pressure means for moving said valve and including a cylinder having a piston therein connected with said valve, and means for controlling said fluid pressure means and comprising connected conduits for supplying a motive fluid to the opposite ends of said cylinder, independent valves for controlling the passage of fluid through said conduits to said cylinder, and check valves for preventing the passage of fluid through said connected conduits from one side of said piston to the other when said valves are open.

13. In an apparatus of the class described, the combination of a conduit, a needle valve in said conduit adapted to close in the direction of flow through said conduit, a stem on said valve having a piston connected therewith, a cylinder in which said piston moves, means for supplying a motive fluid from the conduit to said cylinder for moving said valve and comprising connected conduits leading to the opposite ends of said cylinder, independent valves in said connected conduits and adapted to control the supply of motive fluid to said cylinder, and means in said connected conduits for preventing the passage of fluid from one side of said piston to the other when said valves are open.

In testimony whereof I affix my signature in presence of two witnesses.

WILLIAM A. DOBLE.

Witnesses:
 FREDERICK GFELLER,
 ERNEST W. ORTON.